(12) United States Patent
Ohno

(10) Patent No.: US 6,606,292 B2
(45) Date of Patent: Aug. 12, 2003

(54) RECORDING METHOD FOR PHASE-CHANGE RECORDING MEDIUM

(75) Inventor: Takashi Ohno, Kanagawa (JP)

(73) Assignee: Mitsubishi Chemical Corporation, Tokyo (JP)

(*) Notice: Subject to any disclaimer, the term of this patent is extended or adjusted under 35 U.S.C. 154(b) by 0 days.

(21) Appl. No.: 10/165,285

(22) Filed: Jun. 7, 2002

(65) Prior Publication Data

US 2002/0167879 A1 Nov. 14, 2002

Related U.S. Application Data

(63) Continuation of application No. 09/753,911, filed on Jan. 3, 2001, now Pat. No. 6,424,610.

(30) Foreign Application Priority Data

Jan. 17, 2000 (JP) ........................................ 2000-008275

(51) Int. Cl.[7] ................................................ G11B 7/00
(52) U.S. Cl. ..................... 369/59.11; 369/47.5; 369/116
(58) Field of Search .............................. 369/47.1, 47.35, 369/47.5, 53.1, 53.18, 53.19, 59.1, 59.11, 116

(56) References Cited

U.S. PATENT DOCUMENTS

| | | | |
|---|---|---|---|
| 5,109,373 A | | 4/1992 | Ohno et al. |
| 5,561,656 A | * | 10/1996 | Hurst, Jr. ................. 369/59.12 |
| 5,732,062 A | | 3/1998 | Yokoi et al. |
| 6,285,647 B1 | * | 9/2001 | Van Woudenberg et al. ..... 369/116 |

FOREIGN PATENT DOCUMENTS

| | | |
|---|---|---|
| JP | 03-185628 | 8/1991 |
| JP | 09-134525 | 5/1997 |

OTHER PUBLICATIONS

Noboru Yamada, Eiji Ohno Akahira, Ken'Chi Nishiuch, Ken'Ichi Nagata, Masatoshi Takao High Speed Overwritable Phase Change Optical Disk Material, Japanese Journal of Applied Physics, vol. 26 (1987) pp. 61–66.

Ken'Ichi Nagata, Noboru Yamada, Kenichi Nishiuchi, Shigeaki Furukawa Nobuo Akahira Rewritable Dual–Layer Phase–change Optical Disk, Japanese Journal of Applied Physics, vol. 38 (1999) pp. 1679–1686.

Kazunori Ito, Makoto Harigaya, Mikio Kinoshita, Takashi Shibaguchi, Eiko Suzuji, Michiaki Shinotsuka, Yoshiyuki Kageyama, The Feasibility of High Data Rate 4.7GB Media with Ag–In–Sb–Te Phase Change Material, Proc. Of the 10th Annual Symposium on Phase Change Recording (1998) p. 91–95.

* cited by examiner

*Primary Examiner*—Muhammad Edun
(74) *Attorney, Agent, or Firm*—Katten Muchin Zavis Rosenman

(57) ABSTRACT

In a recording method for a rewritable optical recording medium, immediately before a prospective leading pulse that is a time section where recording light of write power Pw irradiates a phase-change recording layer for the first time as a front low-power energy irradiating step, light of bias power Pb irradiates the phase-change recording layer for a first set time length yT as a preceding low-power energy irradiation step. And immediately after the leading pulse, the light of bias power Pb irradiates the phase-change recording layer for a set time length xT as a succeeding low-power energy irradiation step. The relation between x and y satisfies: $0.95 \leq x+0.7*y \leq 2.5$. The high-power energy beam irradiates the recording medium in such a manner that a period of irradiation for pulses subsequent to the leading pulse is in a range of from 0.5T to 2.5T. The result is that it is possible to facilitate forming/erasing amorphous marks even in a phase-change recording medium devoid of a reflective layer, without any risk of narrowing the range of effective crystallization speeds.

8 Claims, 7 Drawing Sheets

Sub./100/7/160nm, Ge8Sb65Te27
635nm, NA0.6, 3.8m/s, Clock=26.16MHz, 10T tone signal was written
Pw=11mW Sub. /100/7/160nm, Ge8Sb65Te27
635nm, NA0.6, 3.8m/s, Clock=26.16MHz, 10T tone signal was written
Pw=11mW, Pe=3.5mW Pe-0.3T(Pw)-xT(0)-0.3T(Pw)-0.7T(0)....-Pe

RECORDING METHOD FOR PHASE-CHANGE RECORDING MEDIUM

This application is a continuation of Ser. No. 09/753,911, filed Jan. 3, 2001 and now U.S. Pat. No. 6,424,610.

BACKGROUND OF THE INVENTION

1. Field of the Invention

The present invention relates to a phase-change recording method suitable for recording on a phase-change recording medium, which can be in a multiplayer structure and is large in transmission factor (transmittance) like an optical disc enabling high-density recording, by utilizing a rewritable recording phase-change medium.

2. Description of Related Art

Nowadays, as information amount growingly expands, demands for recording mediums which can record/retrieve a large capacity of data at high density and high speed have been on the rise. Therefore optical discs have been expected to meet these growing demands. Optical discs are divided into two types: one type enabling recording for only one time, and the other type enabling recoding/erasing for many times. The rewritable optical discs are exemplified by a magneto-optical recording medium utilizing a magneto-optical effect, and a phase-change medium utilizing change in reflectance with reversible change in crystalline state.

This phase-change recording medium can make recording/erasing only by modifying laser light power (output) without outer magnetic field and enables downsizing a recording/retrieving apparatus. Further, if the phase-change recording medium is used, it is possible to realize recording/retrieving information in high density by a short-wavelength light source without changing the material of a recording layer in particular from a medium that is recordable/erasable by light power about 800 nm in wavelength, which is most popular in the art.

Thin films of chalcogen alloy are used for the recording layer material of many of commercially available phase-change mediums. This chalcogen alloy is exemplified by GeSbTe alloy, InSbTe alloy, GeSnTe alloy, and AgInSbTe alloy. In the currently practical recording method for a rewritable phase-change recording medium, the recording layer takes a crystalline state as unrecorded/erased state, and an amorphous bit is formed for recording. An amorphous bit is formed by heating the recording layer up to a temperature higher than a melting point and then rapidly cooling down the recording layer.

In order to prevent possible vapor and deformation, which might occur due to the heating of the recording layer, the recording layer is ordinarily sandwiched a set of upper and lower dielectric protective layers which are resistant to heat and chemically stable. Further, in general, a metallic reflective layer is placed on the sandwich structure to provide a quadri-layer structure so that heat dispersion is facilitated and amorphous marks are formed stably.

This metallic reflective layer serves to escape heat generated when the recording layer is irradiated by a recording laser light beam (hereinafter also called "light beam"). Namely, if an amorphous substance is used in a phase-change medium, the recording layer is locally melted by the light beam, and then the resulting recording layer is rapidly cooled to form an amorphous mark. In the presence of inadequate radiation, this amorphous mark cannot be formed neatly as intended; consequently the metallic reflective layer is required.

In order to form the amorphous mark stably, the divided pulse method has been customary to divide a mark-forming laser pulse. On many occasions, assuming that a reference clock period is T, a pulse sequence of the period T is irradiated according to the mark length. At that time, to make the temperature distribution in the mark uniformly, the time length of the leading pulse (the first pulse) is set to larger than that of the second and subsequent pulses.

The divided pulse method is a method of forming an amorphous mark of a time length nT by alternately irradiating the phase-change recording medium with a write power Pw having a relative high power value and a bias power Pb having a relatively low power value. Here n is a natural number equal to or larger than 4).

Specifically, of the output pattern (pulse pattern) of the light beam, a writing pulse to be output at high power is divided into a plurality of pulses, and an off-pulse to be output at low power is divided into a plurality of pulses; these high and low power irradiations are alternately repeated. In the conventional divided pulse method, for every pulse, the time length of the divided writing pulse to be output at high power and the time length of the divided off-pulse are nearly 0.5T.

The pulse patter when the amorphous mark is formed is disclosed in the following publications 1, 2 and 3. Publication 1 is "The Feasibility of High Data Rate 4.7 GB Media with Ag—In-Sub-Te Phase Change Material", (Collection of Theses presented in 10th Symposium of Phase Change Media Society 1998) disclosing a technology relating to the pulse pattern.

Publication 2 is "Rewritable Dual-Layer Phase-change Optical Disk", Jpn. J. Appl. Phys. Vo. 38(1999) pp. 1679–1686) disclosing a technology relating to an optical disk in the form of a rewritable phase-change medium having a multiplayer structure. Specifically Publication 2 describes a rewritable pulse pattern.

Publication 3 is Japanese Laid-Open Publication No. Hei 3-185628 (U.S. Pat. No. 5,109,373) disclosing a technology relating to a method and apparatus for recording signals on an optical information recording medium, such as an optical disk, for recording/retrieving optical information at high speed and in high density using a laser light beam. Specifically, Publication 3 describes a value satisfying a repeating period τ in an intermediate pulse sequence.

In the meantime, for erasing (crystallizing), the recording layer is heated up to a temperature higher than a crystallization point of the recording layer and lower than a melting point of the recording layer. In this case, the dielectric protective layer serves a heat storage layer to keep the recording layer at a high temperature enough for crystallization.

Further, in a 1-beam overwritable phase-change medium, the above-mentioned erasure/rewrite processes are carried out only by modifying a single focused light beam. This technology is disclosed in Publication 4 (Jpn. J. Appl. Phys. 26 (1987), suppl. 25-4, pp. 61–66). Furthermore, by using 1-beam overwritable phase-change medium, the layer structure of a recording medium and the circuit structure of a recording drive apparatus would be simple. Therefore a system using a 1-beam overwritable phase-change medium is watched with a keen interest for inexpensiveness, high density and large capacity.

Recently, attempts have been made to increase the number of layers of a recording medium to a much higher density. An attempt to increase the recording density is to manufacture two or more recording medium parts spaced from each other by a distance larger than the focus depth of an optical system being used. In this attempt, the recording medium parts except the farthest recording medium part, as viewed from the substrate where the laser light comes in, respectively require a high transmission factor of 30% or more to permit the laser light to pass.

Consequently, in order to permit the laser light, it is essential that basically no metallic reflective layer is used, or a metallic reflector has such a small thickness as to permit adequate light to pass.

Yet in the recording medium devoid of a metallic reflective layer or having a thin metallic reflective layer, since only inadequate heat radiation effect can be achieved, re-crystallization would tend to occur when an amorphous mark is formed, so that an amorphous mark neat as intended is difficult to form.

There could be another attempt to prevent re-crystallization by modifying the composition of the recording layer at least to make the crystallization speed slow. But because of the slow crystallization speed, an amorphous mark to be irradiated by the erasure power (hereinafter called "erasure power irradiation section") after having been formed can be crystallized only inadequately so that the amorphous mark cannot be erased.

Namely, when making recording on a phase-change medium that is devoid of a metallic reflective layer or has a thin metallic layer, it is difficult to prevent re-crystallization of the mark during recording while keeping adequate erasure ratio at the erasure power irradiation section, thus narrowing the range of effective crystallization speeds for a rewritable recording medium.

SUMMARY OF THE INVENTION

With the foregoing problems in view, it is an object of the present invention to provide a recording method for a rewritable phase-change recording medium which method facilitates forming/erasing amorphous marks even if a reflective layer of the recording medium is only a limited thickness or void, without any risk of restricting the range of effective crystallization speeds.

In order to attain the above object, according to a generic feature of the present invention, there is provided a recording method for a phase-change recording medium having a phase-change recording layer in which amorphous marks each having a time length nT (T is the data reference clock period, and n is a natural number equal to or larger than 4) are formed by alternately irradiating the recording medium at least with a high-power energy beam having a relatively high power value and a low-power energy beam having a relatively low power value, said method comprising the steps of: (a-1) irradiating the low-power energy beam to the recording medium for a first set time yT (y is a natural number larger than or equal to 0) as a preceding low-power pulse irradiation step immediately before a prospective leading pulse that is a time section where the high-power beam is irradiated for the first time, and (a-2) irradiating the low-power energy beam to the recording medium for a second set time xT (x is a natural number larger than 0) as a succeeding low-power pulse irradiation step immediately after said prospective leading pulse, x and y having a relation expressed by the following formula $$0.95 \leq x+0.7*y \leq 2.5$$

where * is an arithmetic symbol representing a multiplication; and (b) irradiating the high-power energy beam to the recording medium in such a manner that a period of irradiation for pulses subsequent to the leading pulse is in a range of from 0.5T to 1.5T.

According to this recording method of the present invention, it is possible to prevent re-crystallization of the marks during recording, which would have been encountered with a small-thickness phase-change recording medium, even if the phase-change recording medium is devoid of any metallic reflective layer. And since the conventional pulses except for the leading end portion of a divided pulse signal can be utilized without any special reconstruction, it is possible to facilitate circuit designing.

Further, it is possible to prevent re-crystallization of the marks during recording, with keeping an adequate erasure ratio at the erasure power irradiation section, even if information in terms of different mark lengths is recorded on a phase-change recording medium devoid of a metallic reflective layer or having a thin metallic reflective layer, thus eliminating the conventional problem that restricts the range of effective crystallization speeds.

BRIEF DESCRIPTION OF THE PREFERRED EMBODIMENT(S)

Figure 1:
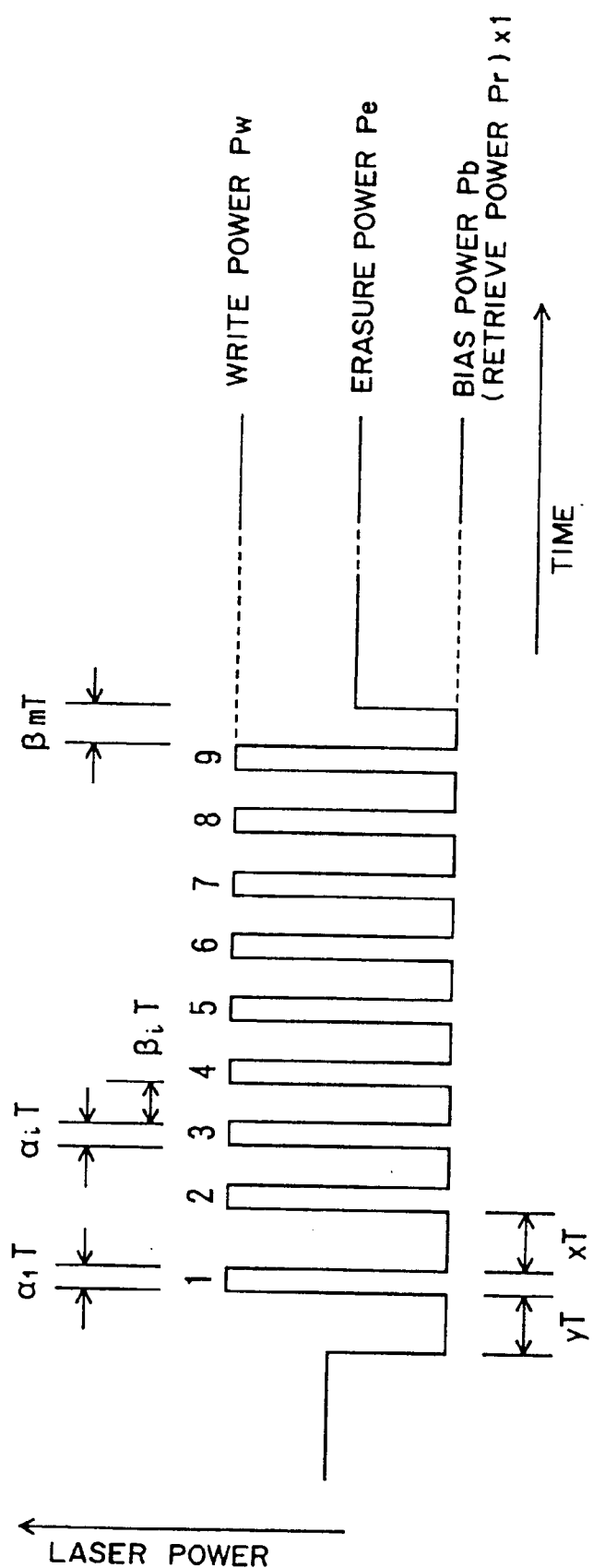
FIG. 1 is a laser pulse waveform diagram illustrating a representative pulse pattern to be used in a recording method, for an optical phase-change recording medium, according to one embodiment of the present invention.

A preferred embodiment of the present invention will now be described with reference to the accompanying drawings.

The present inventor(s) have discovered that, in a phase-change recording medium of the type in which the cooling effect is small, re-crystallization of an amorphous mark tends to progress from the leading edge of the mark to the trailing edge of the mark during recording. The inventor(s) have also discovered that rapid cooling of the leading mark edge, i.e. a start portion of the mark being formed, prevents the mark from being re-crystallized, thus reaching the present invention.

According to the present invention, because an off-pulse is inserted contiguously to a writing pulse, which forms the leading edge of an amorphous mark, in a pattern of successive pulses for forming an amorphous mark during the recording using a divided pulse method, it is possible to cool the leading edge of the mark rapidly so that re-crystallization can be prevented.

Namely, in a pattern of successive pulses, only the off-pulse, the writing pulse forming the leading edge of the mark, are modified from that in the conventional method to prevent re-crystallization. According to the present invention, since the divided pulse method employing the conventional technology can be used for the pulse pattern except the divided pulse, it is possible to limit the number of modifications to a minimum so that a circuit reflecting the modifications is easy to design.

The principles of the present invention is particularly useful when applied to an optical disc having a phase-change recording layer. Generally an optical disc has a spiral groove or concentric grooves, and a land or lands defined between the grooves; the inter-groove land serves or serve as a recording track for recording and retrieving. In a CD-RW or a DVD-RW, which are each another type of phase-change optical disc, the inside of the groove serves as a recording track while amorphous marks are formed in a crystalline recording layer.

This type optical disc has a quadri-layer structure composed of a protective layer, a phase-change recording layer, a protective layer, and a reflective layer, which are disposed one over another reversely in the described order on the substrate. In still another optical recording medium having two or more recording layers for the purpose of increasing the capacity, a protective layer, a phase-change recording layer, a protective layer, a resin layer, a protective layer, a phase-change recording layer, a protective layer, and a reflective layer are disposed one over another reversely in the described order on the substrate. In an alternative, two optical discs each having this structure are attached to one another. In either type optical disc, an energy beam enters the recording layer(s) from the substrate side for recording/retrieving. In another alternative, with the various layers on substrate being arranged exactly in the reverse order, an energy beam enters the recording layer(s) from the side opposite to the substrate for recording/retrieving.

The foregoing results are particularly remarkable when the present invention is applied to a recording medium that is void of a reflective layer disposed contiguously to the recording layer with or without the medium of a protective layer, or a recording medium that has a thin reflective layer of 30 nm or smaller in thickness contiguously to the recording layer with or without the medium of a protective layer.

In other words, in a conventional recording medium having an ordinary-thickness reflective layer, which would tend to encounter re-crystallization, rapid cooling of the leading edge of the mark according to the present invention is relatively less effective to prevent re-crystallization.

The process of re-crystallization, in which the formed amorphous area is progressively re-crystallized from the edge of the amorphous area and of the crystalline area around the amorphous area edge as the amorphous mark is formed, is typically exemplified by the following.

It is supposed from the studies of the present inventor(s) that, in the case of a recording medium whose cooling effect is small, re-crystallization tends to occur at the leading edge of the mark, particularly from the transversely (perpendicularly to the tracking direction) central portion of the mark edge, and progresses from the central portion toward the trailing edge of the mark. On the other hand, it is presumed that, in the case of a recoding medium whose cooling effect is large, re-crystallization tends progresses from the transverse edge of the mark toward the center.

Because the present invention retards re-crystallization by rapidly cooling the leading edge of the mark, it is possible to retards the progress of re-crystallization from-the leading edge of the mark toward the leading edge of the mark when the present invention is applied to the recording medium whose cooling effect is small; the cooling effect is large.

Therefore, in the case of a recording medium that is void of a reflective layer disposed contiguously to the recording layer with or without the medium of a protective layer, or a recording medium that has a thin reflective layer of 30 nm or less in thickness disposed contiguously to the recording layer with or without the medium of the protective layer, the cooling effect is remarkably large.

For example, if the phase-change recording medium is a recording medium that has two or more phase-change recording layers with another layer sandwiched therebetween, because it is essential to expose also the farther phase-change recording layer to the recording/retrieving energy beam, a thick reflective layer cannot be located in the traveling path of the energy beam. As a consequence, the nearer phase-change recording layer is limited to a recording medium that is void of a reflective layer disposed contiguously to with or without the medium of a protective layer, or a recording medium that has a very thin reflective layer that is 30 nm or smaller in thickness. The present invention is particularly remarkable in cooling effect when recording is made in the nearer phase-change recording layer with respect to the recording/retrieving energy beam.

For preventing re-crystallization of the leading edge of the mark, according to the present invention, it is essential to rapidly cooling the leading mark edge. First of all, a pulse patter will now be described with reference to FIGS. 1 and 2.

FIG. 1 is a laser pulse waveform diagram illustrating a representative pulse pattern to be used in the recording method according to the present invention. The horizontal coordinate represents the time, and the vertical coordinate represents the laser power; Pw is the write power, Pe is the erasure power, Pb is the bias power, and Pr is the retrieve power. Basically, the write power Pw and the bias power Pb are used for forming the mark, and the erasure power Pe is used for erasing. And the retrieve power Pr is used for retrieving the recorded information.

In the following description, a pulse to be output by high power (write power Pw) is called "writing pulse" or "recording pulse", and a time section during which a recording pulse is irradiated with the write power Pw is called "recording pulse section" or "recording power irradiation section". The latter section corresponds to a high-power laser irradiation section.

Further, a pulse to be output by low power (bias power Pb) is called "off-pulse", and a time section during which the off-pulse irradiates is called "off-pulse section" or "bias power irradiation section". The latter section corresponds to a low-power laser irradiation section.

FIG. 1 illustrates how to form a mark having a time length 10T (T is a reference clock period). The pulse pattern of FIG. 1 is divided into 9 writing pulses designated by reference numbers 1, 2, . . . , 9. In a general sense, assuming that a mark having a time length nT is formed, the number (m) of write pulses is any one of n, n−1 and n−2. In the illustrated example of FIG. 1, m=n−1.

Each of these 9 writing pulses 1 through 9 has a power value equal to a respective write power Pw, and each of off-pulses preceding and succeeding the individual writing pulse has a power value equal to a respective bias power Pb. Further, each of radiation power values for time sections except the writing pulses and off-pulses is equal to an erasure power Pe.

Ordinarily the write power Pw is preferably 20 mW or lower, more preferably 14 mW or lower. It is a common knowledge that the lower the laser power to write, the more the recording medium is regarded as preferable; this is true because using a low output of laser does suffice. Practically, however, the write power Pw is preferably 8 mW or higher. Because writing by a too low power means tending to become inferior when retrieving.

For the erasure power Pe, a value is selected such that an old amorphous mark to be erased is adequately crystallized. Ordinarily the erasure power Pe is within a range of from 30% to 70% of the write power Pw.

The retrieve power Pr is the power of an energy beam to be irradiated when retrieving the recorded information; for the retrieve power Pr, a low value is selected, ordinarily within a range of from 0.5 to 1.0 mW.

For the bias power Pb, a value is selected such that the recording layer heated by the write power Pw is rapidly cooled to form an amorphous mark. To increase the cooling rate of the recording layer, the bias power Pb is preferable low. The ratio of the bias power Pb and the erasure power Pe is ordinarily Pb/Pe $\leq$ 0.5, preferably Pb/Pe $\leq$ 0.3. With a view to tracking ability, the bias power Pb is close or equal to the value of the retrieve power Pr.

Consequently, as a generic feature, the recording method of the present invention is a recording method for a phase-change recording medium having a phase-change recording layer in which amorphous marks each having a time length nT (T is the data reference clock period, and n is a natural number equal to or larger than 4) are formed by alternately irradiating the recording medium at least with a high-power energy beam having a relatively high power value and a low-power energy beam having a relatively low power value, comprising the following steps:

a preceding low-power pulse irradiation step, immediately preceding a prospective leading pulse that is a time section where the high-power beam is irradiated for the first time, in which the low-power energy beam is irradiated to the recording medium for a first set time yT (y is a natural number larger than or equal to 0; and a succeeding low-power pulse irradiation step, immediately succeeding the prospective leading pulse, in which the low-power energy beam is irradiated to the recording medium for a second set time xT (x is a natural number larger than 0).

And x and y has a relation expressed by the formula $0.95 \leq x+0.7*y \leq 2.5$ where * is an arithmetic symbol representing a multiplication.

Namely in the present recording method, each of off-pulse sections preceding and succeeding the leading pulse (writing pulse 1) of FIG. 1 has a large length (time length) as compared to that used in the conventional divided pulse method.

In the pulse pattern as depicted by FIG. 1, for the purpose of rapidly cooling the leading edge of an amorphous mark, a low-power off-pulse having a time length xT is located between the leading pulse (writing pulse 1) of a divided pulse for forming the mark and the second pulse (writing pulse 2) where x is a natural number larger than 0.

The studies made by the present inventor(s) indicate that as long as at least the condition as of the laser power is within an ordinary range, the leading edge of the mark tends to be cooled if the time length xT of the low-power laser irradiation section (off-pulse) is set remarkably long as compared to that in the conventional method, thus obtaining an excellent recording characteristic. The off-pulse having a time length xT succeeding the writing pulse 1 is hereinafter also called "xT pulse".

It is also effective to locate an off-pulse having a time length yT immediately preceding the leading pulse where y is a natural number larger than or equal to 0. The off-pulse having a time length yT preceding the writing pulse 1 is hereinafter also called "yT pulse".

If the sum of x and 0.7*y is too small, an intended cooling effect for the leading edge of the mark cannot be achieved. Consequently that value is 0.95 or larger, preferably 1.3 or larger. Otherwise if the sum of x and 0.7*y is too large, there is a danger that an old amorphous mark might be left erased, and/or the amorphous local portion by the leading pulse and the amorphous local portion succeeding the writing pulse might would optically separated. Consequently that value is 2.5 or smaller, preferably 2.0 or smaller.

Further, the value of y may be close (small) to or equal to 0. If y is 0, the leading pulse being a time section during which the write power Pw is irradiated for the first time is irradiated for a predetermined time (leading pulse irradiation step). Then in the succeeding low-power pulse irradiation step immediately succeeding the leading pulse irradiation step, the bias power Pb is irradiated for a second set time xT. x may be $0.95 \leq -x \leq -2.5$. Namely, increasing xT pulse in time length without providing yT pulse suffices to obtain the intended cooling effect.

However, since it is essential to increase xT pulse in time length for achieving the same cooling effect without providing yT, the writing pulse 1 would be located forwardly, which would be a possible cause for increasing the length of the whole mark. Consequently it is preferable and/or effective to combine xT pulse and yT pulse.

If the value x is excessively small, it would be difficult to retard re-crystallization of the leading edge of the mark. Consequently, x is ordinarily equal to or larger 0.1, preferably equal to or larger than 0.3. Otherwise if the value x is excessively large, there is a danger that an old amorphous mark might be left erased, and/or the amorphous local portion by the leading pulse and the amorphous local portion succeeding the writing pulse might would optically separated. Consequently that x is ordinarily 2.0 or smaller.

Further, if the value y is excessively large, there is also a danger that an old mark might be inadequately crystallized during overwriting. Consequently x is ordinarily 2.0 or smaller.

It is preferable that the present invention is used in forming an amorphous mark by a pulse pattern of two or more writing pulses. A short mark such as 3T mark (n=3 in nT mark) may be formed by a pulse pattern of a single writing pulse. In the case of a single writing pulse 1, since only the bias power Pb or the erasure power Pe is irradiated after the writing pulse 1, the leading edge of the mark is relatively rapidly cooled. Otherwise in the case of two or more writing pulses, since the high-power writing pulse 2 is irradiated subsequently to a possible off-pulse succeeding the writing pulse 1, it would be difficult to cool the mark. Consequently as proposed by the present invention, it is remarkably effective to make both xT pulse and yT pulse longer in time length. It is preferable that the present invention is applied in forming a mark having a time length equal to or larger than 4T mark (n=4 in nT mark).

The pulse lengths of the writing pulses 1 through 9 of FIG. 1 will now be described using FIG. 2.

Figure 2:
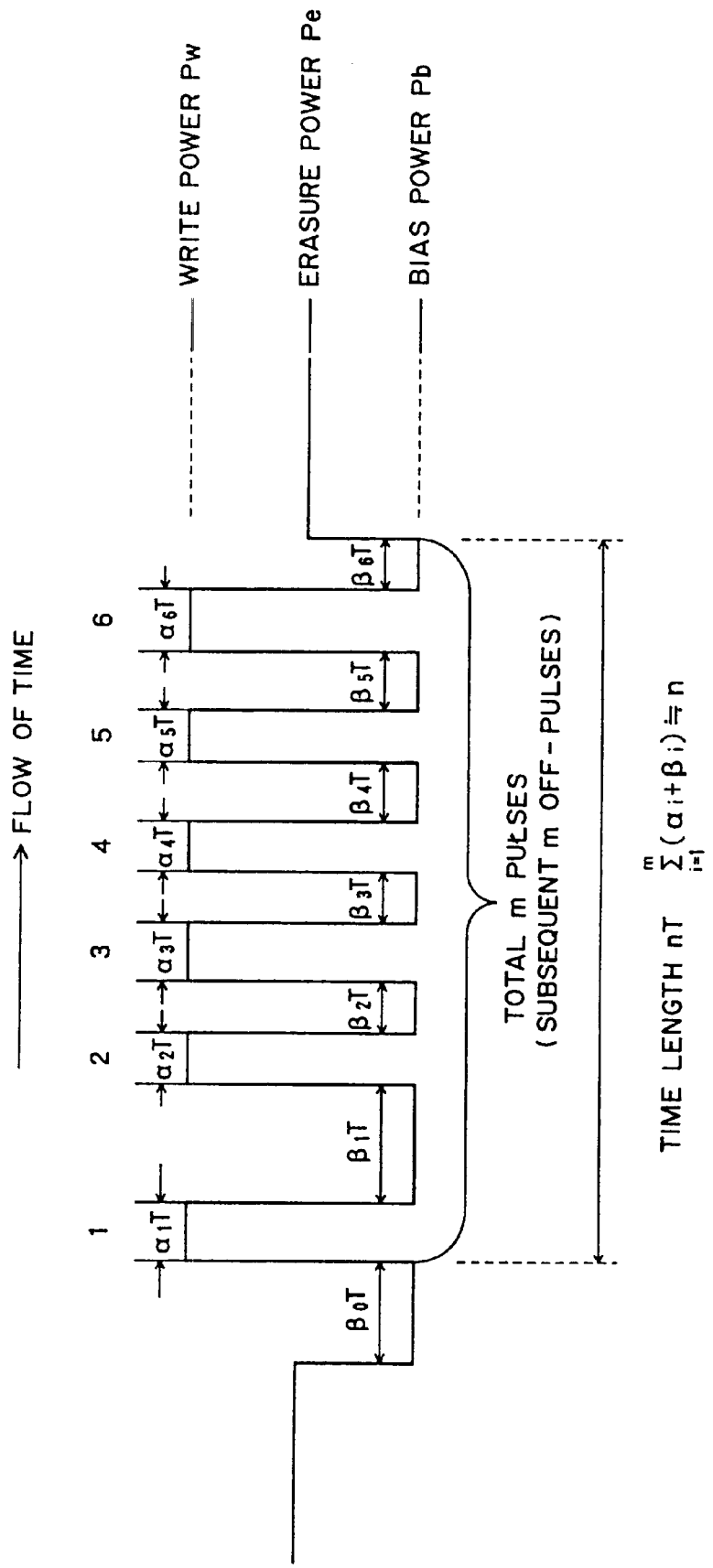
FIG. 2 is a diagram illustrating pulse lengths in the pulse pattern of FIG. 1.

FIG. 2 illustrates pulse lengths in a representative pulse pattern to be used in the recording method of the present invention. The number of writing pulses of FIG. 2 is m in total (m is a natural number), m=6 as the illustrated example. Further, the individual writing pulses 1 through 6 have respective pulse lengths $\alpha_1 T$ through $\alpha_6 T$; subsequently to the individual writing pulses, off-pulses having respective pulse lengths $\beta_1 T$ through $\beta_6 T$ are respectively located. The total time length of the combination of m writing pulses and m off-pulses is nearly equivalent to the mark length nT. Therefore the following formula is satisfied.

$$\sum_{i=1}^{m}(\alpha_i + \beta_i) \approx n \quad (3)$$

i is a natural number, $\alpha_i$ is a coefficient determining a time length of the i-th writing pulse, and $\beta_i$ is a coefficient determining a time length of the i-th off-pulse.

$$\sum_{i=1}^{m}(\alpha_i + \beta_i)$$

represents the sum of total $(\alpha_i+_i)$ for i from 1 to m.

$$\sum_{i=1}^{m}(\alpha_i + \beta_i)$$

should by no means be precisely equal to n, ordinarily nearly n−2 to n+2.

If the time length $\alpha_1 T$ of the leading pulse (writing pulse 1) of FIG. 2 is excessively large, the mark would be excessively heated so that re-crystallization cannot be retarded even when both the off-pulses preceding and succeeding the leading pulse are increased in time length, which would be failed to retard re-crystallization. Consequently the value $\alpha_1 T$ is preferably 1.5T or smaller, more preferably 1.0T or smaller, much more preferably 0.8T or smaller. Otherwise if the value $\alpha_1 T$ is excessively small, the temperature of the recording layer can only inadequately rise. Consequently the value $\alpha_1 T$ is preferably 0.2T or larger, more preferably 0.3T or larger.

Further, the pulse length $\alpha_1 T$ is set to preferably a value smaller than the second set time length xT so that the leading edge of the mark can be rapidly cooled.

Furthermore, if the time length $\alpha_i T$ (i is a natural number satisfying i≧2) of the second or succeeding writing pulse is excessively large, it would be difficult to retard re-crystallization. Consequently the value $\alpha_1 T$ is preferably 0.8T or smaller, more preferably 0.6T or smaller. Otherwise if the value $\alpha_1 T$ is excessively small, the temperature of the recording layer can only inadequately rise. Consequently the value $\alpha_1 T$ is preferably 0.2T or larger, more preferably 0.3T or larger.

$\beta_m$ (e.g., e $\beta_6$) appearing at the trailing end of the pattern is ordinarily within a range of from 0T to 1.5T; by varying this time length, it is possible to control the time length of an amorphous mark. If this value is excessively large, there would be a danger that an old mark might be inadequately crystallized during overwriting.

In the present invention, the period of irradiation for each of pulses (the writing pulse 2 or any writing pulse subsequent thereto) subsequent to the leading pulse (writing pulse 1), i.e. a time section during which the high-power energy beam is irradiated, is set to a value close to 1T. Specifically this value is within a range of from 0.5T to 1.5T. The term "period" is a time length from the rising of the writing pulse to the rising of the next writing pulse.

Namely, $\alpha_i + \beta_i$ (i is a natural number, i=2 through m−1) has a value close to 1. Specifically this value is within a range of from 0.5 to 1.5. If this value is far remote from 1, the following problems would occur.

For forming an amorphous mark, it is essential that the value of $\beta_i$ is somehow large to increase the cooling rate. Otherwise if $\alpha_i+\beta_i$ is far smaller than 1, it is impossible to increase $\beta_i$ to an adequate extent so that the cooling rate would become small, tending to be a cause for re-crystallization of the mark. Reversely, if $\beta_i$ is large, $\alpha_i$ would be small so that the temperature of the recording layer is difficult to rise to an adequately high value.

In the meantime, the concept of increasing $\alpha_i+\beta_i$ (i is a natural number, i=2 through m−1) to a value far larger than 1 is disclosed in Japanese Laid-Open Publication No. Hei 9-134525 (U.S. Pat. No. 5,732,062). However, assuming that $\alpha_i+\beta_i$ is fixed to a value equal to or larger than 2, the length of the mark would be increased by 2T as the number of the writing pulses (and the off-pulses associated therewith) is increased by 1. Therefore, in this known recording method, it is impossible to separately record two different kinds of marks, such as nT mark and (n+1)T mark, whose difference is 1T.

Consequently, in the present invention, a writing pulse (and off-pulses associated with the writing pulse) such that the value of $\alpha_i+\beta_i$ is 1 is added to an nT-mark pulse pattern at any location to obtain an (n+1)T-mark pulse patter so that the difference between the time length of nT mark and that of (n+1)T mark is 1T.

Namely, the value of $\alpha_i+\beta_i$ (i is a natural number, i=2 through m−i) is non-uniform as different values such as 1 and 2 exist at random.

However, the values $\alpha_i$ and $\beta_i$ are significantly influential on the temperature distribution and temperature process in the recording layer so that the temperature or temperature varying process would vary considerably at each place where a different value $\alpha_i$ or $\beta_i$ exists. Since not only the reachable temperature but also the size of re-crystallized area after a meltdown, which area is related with at least the cooling rate, are significantly influential on the temperature distribution of the recording layer, the mark would vary in shape in a complicated manner depending on the various factors.

Under a particular recording condition, the values $\alpha_i$ and $\beta_i$ could be determined in such a manner that the difference between nT mark length and (n+1)T mark length is 1T. But such values can be effective only for a very limited recording condition so that it is highly likely that the difference of mark length would shift far from 1T under a recording condition slightly different from the above-mentioned particular recording condition. Such problem would occur due to the change in luminescence distribution in the laser beam spot when the recording power and/or the recording apparatus have been changed.

This is true because the temperature distribution change of the recording layer with respect to the recording condition change depends on the value of $\alpha_i+\beta_i$. For example, since the mark shape varies with the recording condition change in different manners respectively for 1 and 2 as the values of $\alpha_i+\beta_i$, it would be difficult to control the mark shape in the presence of the mixed values of $\alpha_i+\beta_i$.

Whereas, in the present invention, if the value $\alpha_i+\beta_i$(i is a natural number, i=2 through m−1) is close to 1, it is possible to increase the mark longer by 1T, without largely changing the temperature distribution, by a single pulse to a succession of pulses at the central portion of a mark forming pulse, so that such problem would hardly occur. Since the value of $\alpha_i+\beta_i$ is constant, the temperature distribution change due to the recording power change is the same for every mark length.

According to the present invention, since re-crystallization during recording is retarded by rapidly cooling the leading edge of the mark, it is unnecessary to vary the period of irradiation for the second writing pulse and those subsequent thereto. For this purpose, the period of irradiation for the succeeding pulse (recording pulse 2 and that subsequent thereto), subsequent to the leading pulse (writing pulse 1) and having a time section during which the high-power energy beam is irradiated, has a value closed to 1T.

But if the mark is short, the temperature for the leading and trailing edges of the mark varies somehow as another pulse is added to the mark; therefore the value of $\alpha_i+\beta_i$ is occasionally preferable to be shifted off 1. Consequently, in the present invention, the value of the pulse irradiation period with the high-power energy beam is 0.5T or larger, preferably 0.8T or larger. And this value is 1.5T or smaller, preferably 1.2T or smaller.

The value of $\alpha_m+\beta_m$ at trailing end of the mark may exceed 1.5 by a large extent so that the length of an amorphous mark can be controlled by varying the length $\beta_m T$ of the trailing end off-pulse.

Thus, even if recording is made in a recording medium that has a reflective layer disposed contiguously to the phase-change recording layer with or without the medium of a protective layer, or is void of a reflective layer or small in thickness, it is possible to prevent re-crystallization of the mark during recording while keeping an adequate erasure ratio during irradiation of the erasure power. Also recording can be made without any risk of restricting the range of effective crystallization speeds. Further, since the influence of re-crystallization is more remarkable during the mark length modulation recording, the present invention is particularly useful when used during the mark length modulation recording.

The construction of the phase-change recording medium on which recording is made according to the present invention will now be described; this description will start with the materials to be used in the recording layer.

The present invention is particularly useful when applied to a change-phase recording medium in which a material tending to be re-crystallized are used in a recording layer. The recording layer material tending to be re-crystallized is exemplified by the following composition, which contains an excessive amount of Sb as compared to an Sub-Te eutectic composition.

Preferably the composition of the recording layer material is $(Sb_aTe_{1-a})_bM_{1-b}$ (where $0.6<a<0.9$, $0.7<b<1$, and M is at least one element selected from the group consisting of Ge, Ag, In, Ga, Zn, Sn, Si, Cu, Au, Pd, Pt, Pb, Cr, Co, O, S, Se, V, Nb, Ta).

The recording layer whose composition contains an excessive amount of Sb as compared to an Sb—Te eutectic composition has a tendency of being re-crystallized as compared to a recording layer of $Ge_2Sb_2Te_4$ composition, which is ordinarily used as a recording layer of a phase-change recording medium. The reason why the phenomenon in which an amorphous mark tends to be re-crystallized is significant in the recording layer of this composition. But partly because crystal nuclei are generated in the recording layer of $Ge_2Sb_2Te_5$ composition, and partly because crystallization progresses from the edge of the amorphous mark with respect to the crystalline area around the mark edge, the difference in mechanism of re-crystallization could be considered as a reason.

In a phase-change recording medium whose recording layer contains this composition and in which the cooling effect is not remarkable, it is presumed that re-crystallization tends to occur the leasing edge of the mark, particularly at the transversely (perpendicularly to the tracking direction) central portion of the leading mark edge, and then progresses from there toward the trailing edge of the mark.

Since re-crystallization is retarded by rapidly cooling the leading edge of the mark, it is possible also retard re-crystallization from progressing from the leading edge to the trailing edge of the mark. Therefore the cooling effect of the present invention is particularly significant when the present invention is applied to a low-cooling-effect phase-change recording medium. Namely, the present invention is particularly useful when recording is made on a phase-change recording medium that is devoid of a reflective layer disposed contiguously to the recording layer with or without the medium of a protective layer, or has a very thin reflective layer of 30 nm or smaller in thickness.

Assuming that the phase-change recording medium is a medium having two or more phase-change recording layers with another layer sandwiched therebetween, the write/retrieve energy power beam has to reach also the farther phase-change recording layer, and therefore a thick reflective layer cannot be located in the traveling path of the power beam. As a consequence, for the nearer phase-change recording layer, the phase-change recording medium to be used in this example is limited to a medium that is devoid of a reflective layer disposed contiguously to the recording layer with or without the medium of a protective layer, or has very thin reflective layer of 30 nm or smaller in thickness. The present invention is particularly useful when used in making recording on the nearer phase-change recording layer with respect to the write/retrieve energy power beam.

Figure 3:
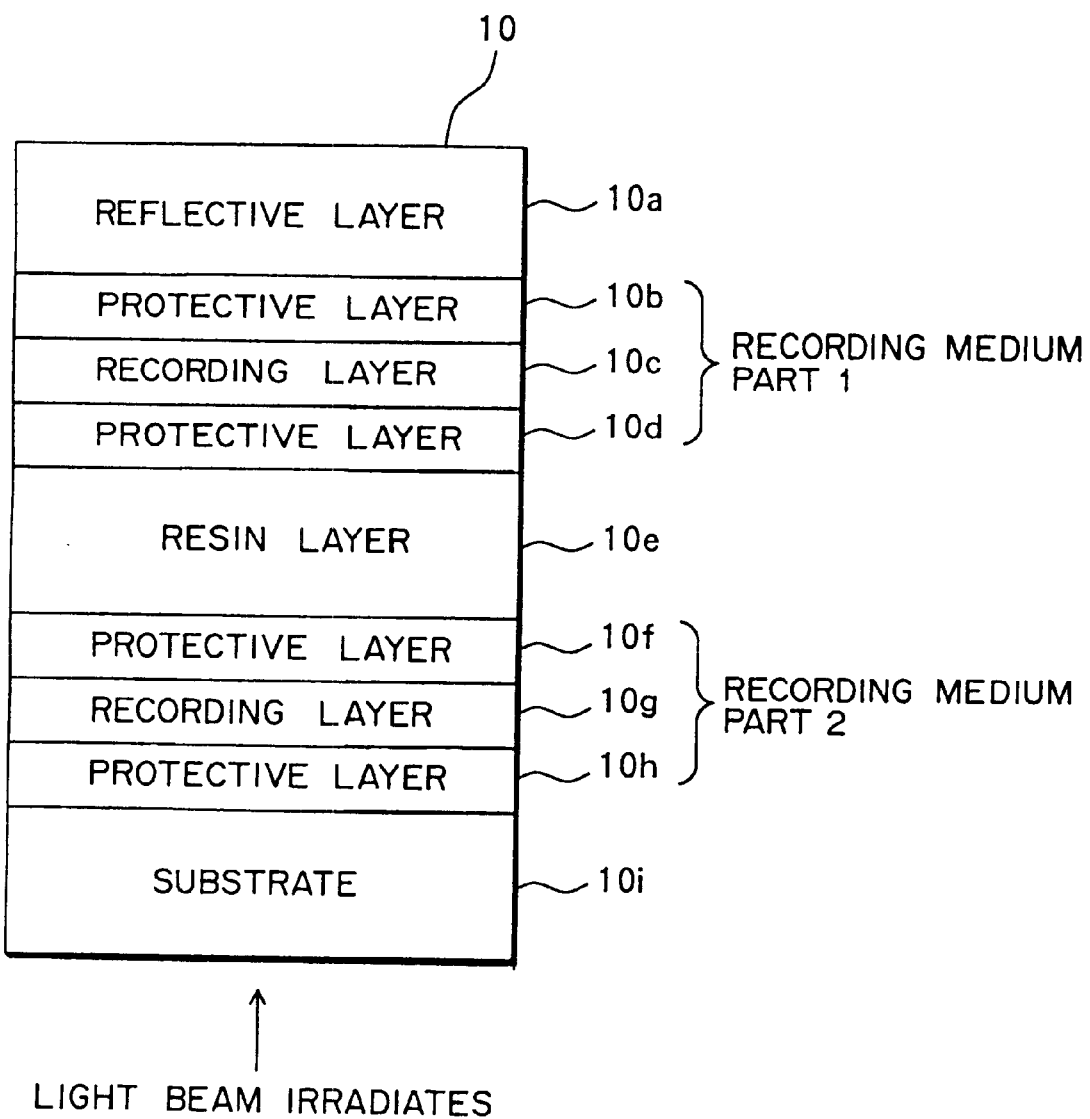
FIG. 3 is a diagram schematically showing a multi-layer structure of a phase-change recording medium.

Secondly the layer structure of the phase-change recording medium to which the present invention is applied will now-be described with reference to FIG. 3. FIG. 3 schematically depicts a multi-layer structure of a phase-change recording medium. The phase-change recording medium 10 of FIG. 3 comprises a reflective layer 10a, a first recording medium part 1, a resin layer 10e, a second recording medium part 2, and a substrate 10i. The energy beam enters the recording medium 10 upwardly from the substrate side, i.e. from the lower side.

The reflective layer 10a reflects the energy beam to disperse heat incoming from a first recording layer 10c via the protective layer 10b. The first recording medium 1 is composed of protective layers 10b, 10d, and the first recording layer 10c. The protective layers 10b, 10d controls absorption of the energy beam to adjust the reflectance, and also controls heat radiation from the first recording layer 10c to retard heat deformation of the first recording layer 10c.

The first recording layer 10c is composed of a phase-change material and varies in its optical characteristic as the crystalline state is reversibly changed. The resin layer 10e serves as a spacer to adjust the position of the recording layer 10c to a focus length of the energy beam.

Likewise, the second recording medium part 2 is composed of protective layers 10f, 10h, and a second recording layer 10g. The protective layers 10f, 10h and the second recording layer 10g are identical in function with the protective layers 10b, 10d and the first recording layer 10c, so repetition of description is omitted here.

Further, the substrate 10i has on its outer surface a recess. For the material of the substrate 10i, resin such as polycarbonate, polyacrylic or polyolefin, or glass may be used. In the present embodiment, since the light (power) beam enters the recording medium 10 via the substrate 10i, the substrate 10i has to be transparent. For the material of the resin layer 10e, the same material as that of the substrate 10i may be used.

The material for the reflective layer 10a will now be described. The reflective layer material is preferably high in reflectance and heat conductance. The reflective layer material high in reflectance and heat conductance is exemplified by an alloy containing Ag, Au, Al, or Cu as a chief component. Among these elements, Ag is an element highest in reflectance and heat conductance.

For short wavelength light, since Au, Cu and Al tend to absorb light as compared to Ag, it is most preferable to use Ag when short-wavelength laser of 650 nm or less is used. Further, Ag is relatively inexpensive as a sputtering target, stable in discharging, high in deposit speed, and stable in atmosphere.

In the presence of impurities contained, Ag, Al, Au, Cu would be somehow lowered in heat conductance and reflectance, and therefore they are not preferable in that respect. But for the other respect, they could be improved in stability and film surface flatness and therefore may contain about 5 atom % or less of an impurity element, such as Cr, Mo, Mg, Zr, V, Ag, In, Ga, Zn, Sn, Si, Cu, Au, Al, Pd, Pt, Pb, Ta, Ni, Co, O, Se, Nb, Ti, N. The thickness of the reflective layer may be ordinarily within a range of from 50 to 200 nm for good result. If the reflective layer is too thin, adequate reflectance and radiating effect cannot be achieved. Otherwise if it is too thick, the reflective layer is not preferable in view of film strain (membrane strain), manufacturing period and cost.

The phase-change recording medium of the illustrated embodiment is void of any reflective layer between the protective layer 10f and the resin layer 10e. Because it is necessary to permit the light beam to reach the recording layer 10c, a thick reflective layer cannot be located in the traveling path of the light beam. But a very thin reflective layer of 30 nm or less, preferably 20 nm or less, in thickness may be located.

With this layer structure, the recording method of the present invention is particularly useful in recording to the second recording medium part 2. This is true because the second recording medium part 2 requires high transmission factor and, for that purpose, is void of any reflective layer or has only a very thin reflective layer so that heat radiating effect is small.

The material of the protective layers 10b, 10d, 10f, 10h will now be described. The material of these protective layers 10b, 10d, 10f, 10h is determined in view of refractive index, heat conductance, chemical stability, mechanical strength, tight contact. For the protective layer material, in general, a metal high in transparency and melting point or oxide, sulfide, nitride of semiconductor, or fluoride as of Ca, Mg, Li may be used. These oxide, sulfide, nitride and fluoride should by no means in the form of a chemical quantitative composition; it is also effective to modify in composition and use different composition in a composite form.

In view of repeating recording characteristic, the material of the protective layers 10b, 10d, 10f, 10h is preferably a dielectric mixture. More specifically, the dielectric mixture is exemplified by a mixture of ZnS or rare earth sulfide and a heat-resistant chemical compound such as oxide, nitride or carbide. For example, a mixture of ZnS and $SiO_2$ is used for the protective layer material of many of commercially available phase-change optical discs. The film density of these protective layers 10b, 10d, 10f, 10h is preferably 80% or more in bulk state in view of mechanical strength.

Further, if the dielectric layer (protective layer) is less than 10 nm in thickness, it is impossible to adequately prevent the substrate 10i and the recording layers (recording layers 10c, 10g) from being deformed so that the protective layers 10b, 10d, 10f, 10h do not tend to perform the original functions. If the dielectric layer thickness exceeds 500 nm, the curving of the dielectric layer when placed on the substrate 10i is proportional to the film thickness, which would be a cause for possible cracks.

Particularly the lower protective layers 10d, 1010h must respectively retard the substrate deformation due to heat and, for this purpose, is preferably 70 nm or more in thickness. This is because, if the protective layer thickness is less than 70 nm, micro substrate deformations would accumulate during repeated overwriting so that retrieving light would scatter to increase noises.

The upper limit of thickness of the protective layers 10b, 10d, 10f, 10h is practically nearly 200 nm in view of depositing time. This is because, if the thickness is larger than 200 nm, the groove geometry as viewed on the recording layer surface would change. Namely, the depth of the groove would be smaller than that in the intended shape on the surface of the substrate 10i, and the width of the groove also would be narrower than that in the intended shape on the surface of the substrate 10i. Further, the protective layer thickness is more preferably 150 nm or less.

Further, the thickness of the first and second recording layers 10c, 10g is preferably within a range of from 3 nm to 20 nm, more preferably from 5 to 10 nm. This is because, if the thickness of the first and second recording layers 10c, 10g is thin, an adequate contract between reflectance in crystalline state and that in amorphous state would be difficult to achieve and initial crystallization would be difficult. Otherwise if it is too thick, the first and second recording layers 10c, 10g tend to decrease in transmittance.

The thicknesses of the first and second recording layers 10c, 10g and the protective layers 10b, 10d, 10f, 10h are respectively selected in such a manner that the absorption efficiency of laser light is improved, and a contrast in amplitude of a recording signal between the recorded state and the unrecorded state would become large, with considering the restriction in view of mechanical strength and reliability, and the interference effect.

The protective layers 10b, 10d, 10f, 10h, the first and second layers 10c, log and the reflective layer 10a are formed ordinarily using the sputtering method. It is desirable to perform depositing for these various layers on a sputtering apparatus (in-line apparatus), with the recording layer target, the protective layer target and the reflective layer target, if necessary, being placed in a common vacuum chamber for the purpose of preventing interlayer oxidation and contamination and also attaining an excellent rate of production.

The present invention should by no means be limited to the foregoing embodiment and variations, and various other changes or modifications may be suggested without departing from the gist of the invention.

The energy beam to be used in recording also should by no means limited to laser light, and an alternative device may be used.

EXAMPLE

A ZnS—$SiO_2$ lower protective layer (100 nm thick), $G_{e8}Sb_{65}Te_{27}$ recording layer (7 nm thick), and ZnS—$SiO_2$ upper protective layer (160 nm thick) were deposited on a 0.6 mm thickness polycarbonate substrate having a guide groove(s) by sputtering, whereupon the upper protective layer was coated with a UV-curable resin protective coating. The guide groove of the substrate is 33 nm in depth, 348 nm in width, and 74 $\mu$m in pitch.

Using an optical disc evaluating apparatus having an optical system which is 0.6 in NA (Numerical Aperture) and 635 nm in laser wavelength, the resulting optical disc was crystallized to initialize by irradiating DC (direct current) light whose output power is 3 mW at a 1.8 m/s linear velocity.

Subsequently the following measurement was carried out. All signals were recorded in the guide groove.

First of all, the erasure ratio indicating a ratio of reinstating crystalline from amorphous was measured under the following conditions: A single pattern signal of approximately 10T in mark length was recorded in the guide groove at a linear velocity of 3.8 m/s, with the output of a reference clock period T of 38.2 ns (1/26.16 MHz), a writing power Pw=11 mW, an erasure power Pe=1 mW, a bias power Pb=1 mW, a retrieve power Pr=1 mW. The pulse pattern of FIG. 1 was used to determine: $\alpha_i(i \geq 1)=0.3$, $\beta_i(i \geq 2)=0.7$, x=0.7, y=0.

The present inventor(s) measured the erasure ratio by irradiating DC light having a predetermined erasure power Pe to the thus recorded signal at a 3.8 m/s linear velocity. The results are shown in FIG. 4.

Figure 4:
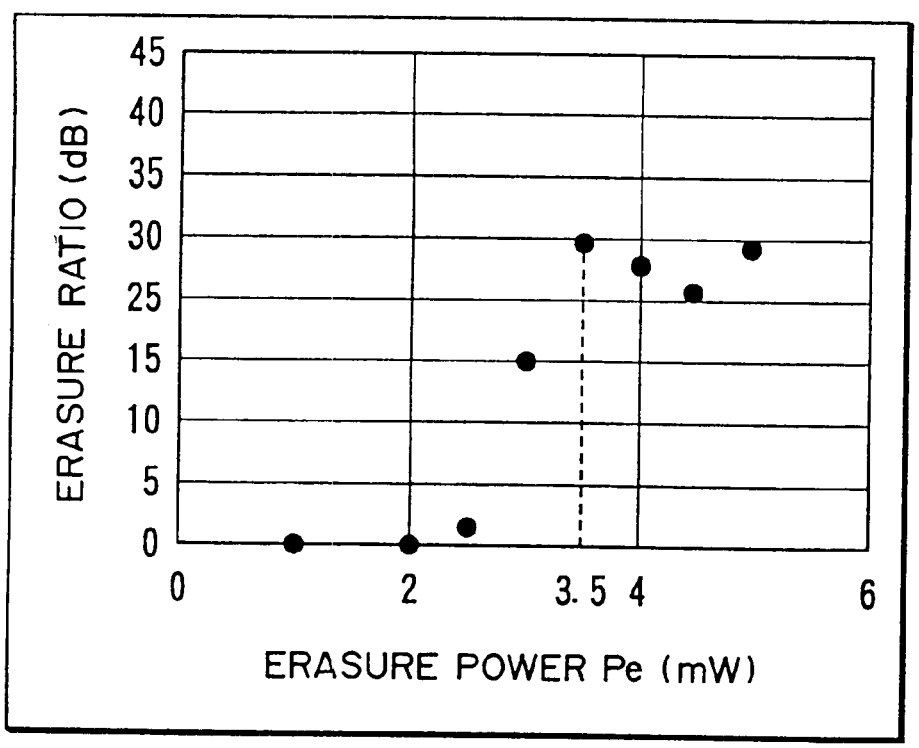
FIG. 4 is a graph illustrating transition of the erasure ratio with respect to the erasure power in the present embodiment.

FIG. 4 is a graph illustrating the transition of the erasure ratio with respect to the erasure power Pe. As shown in FIG. 4, the erasure ratios of nearly 25 dB were obtained with respect to the erasure power Pe of 3.5 mW. The C/N ratio of the unerased signal was 52 dB.

Then, recording was made on this optical disc, and then retrieving was made, whereupon the jitter was measured. Under basically the same recording conditions as those during recording, namely, the erasure power Pe of 3.5 mW, with respect to which value the most preferable erasure ratio was obtained as mentioned above, the write power Pw=11 mW; the same single pattern was recorded by varying the value of x with respect to $\alpha_i(i \geq 1)=0.3$, $\beta_i(i \geq 2)=0.7$ y=0 using the pulse pattern of FIG. 1. The thus recorded signal was retrieved at a 3.8 m/s linear velocity with the retrieve power Pr=0.8 mW, whereupon the jitter was measured. The results are shown in FIG. 5.

Figure 5:
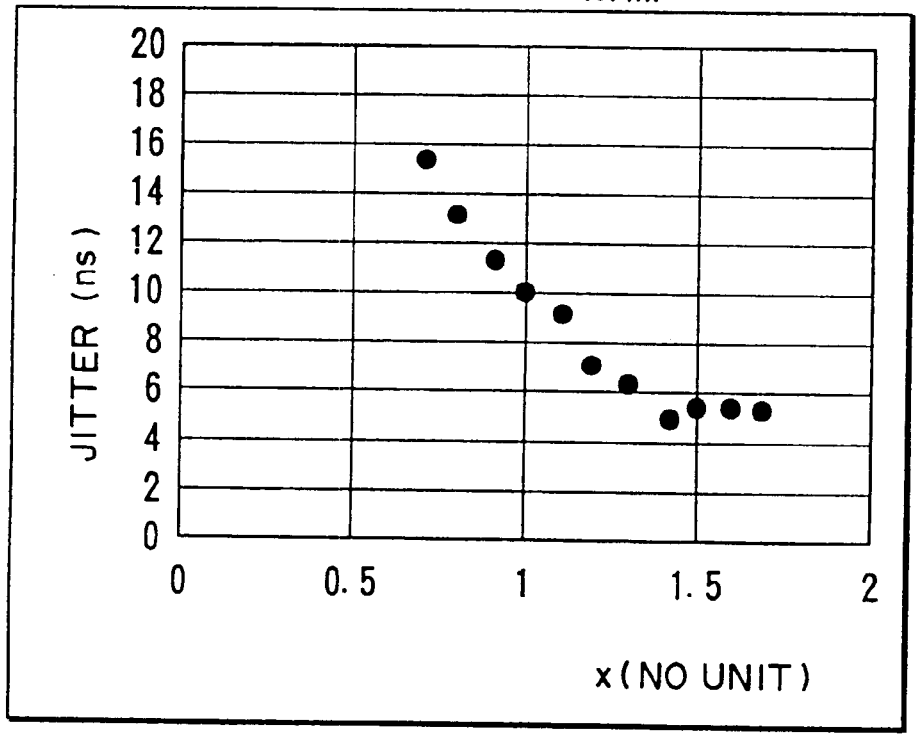
FIG. 5 is a graph illustrating a relation between x of a succeeding low-power pulse irradiation section and the jitter in the present embodiment.

FIG. 5 is a graph illustrating a relation between x of the succeeding low-power pulse irradiation section and the jitter. It turns out from the graph of FIG. 5 that if the value of x was small, the jitter is large, and if the value of x was large, the jitter is small. From the retrieved waveform when x was small, it was observed that the leading edge of the mark was crystallized.

Subsequently, the same measurement was carried out by varying the value of y with x=0.7. The results are shown in FIG. 6.

Figure 6:
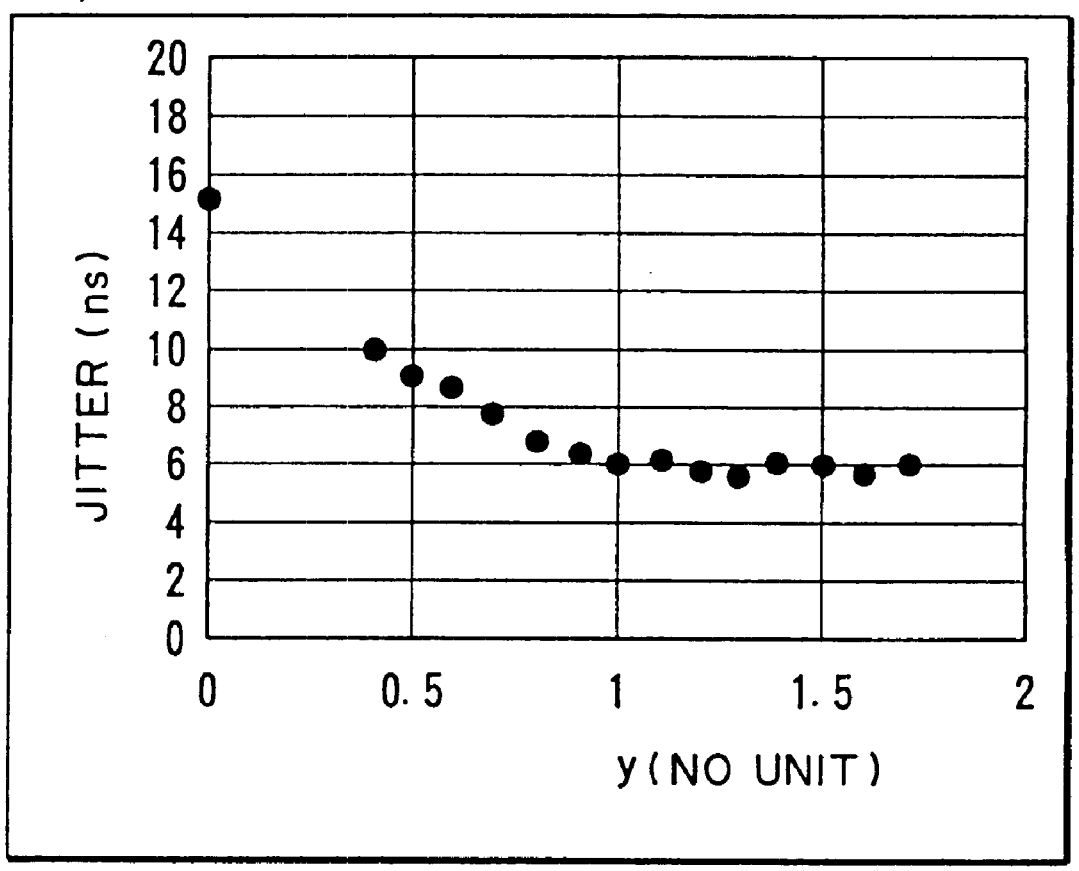
FIG. 6 is a graph illustrating a relation between y of the preceding low-power pulse irradiation section and the jitter in the present embodiment.

FIG. 6 is a graph illustrating a relation between y of the preceding low-power pulse irradiation section and the jitter. If the value of y became large, the jitter became small. Namely, it is understood that both x and y were effective to reduce the jitter.

Figure 7:
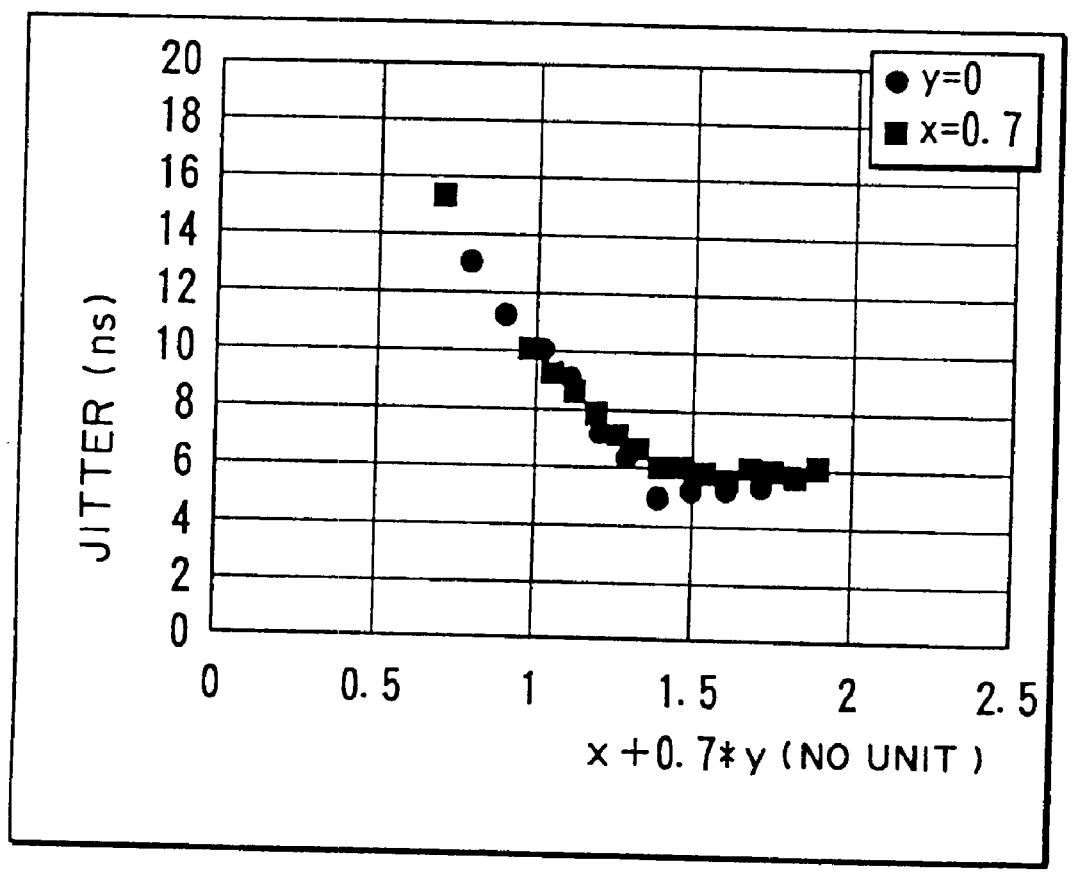
FIG. 7 is a graph illustrating a relation between the value of x+0.7*y and the jitter in the present embodiment.

FIG. 7 is a graph illustrating between the value of x+0.7*y and the jitter. As shown in FIG. 7, it turns out from the experiments of the present inventor(s) that the value of x+0.7*y were excellently correlated with the jitter. Namely, when (x+0.7*y)≧0.95, the jitter was 10 ns or less; and when (x+0.7*y)≧1.3, the jitter was 6.5 ns or less.

Further, the transmission factor was approximately 55% when the recording layer was in amorphous state, and approximately 47% when the recording layer was in crystalline state.

The transmission factor was obtained in the following manner. Laser light of 635 nm wavelength was penetrated through a 0.6 mm thick polycarbonate substrate, and then a 200 nm thick $Al_{99.5}Ta_{0.5}$ film was retrieved, whereupon the reflected light amount $I_1$ was measured. The same laser light was penetrated through the optical disc of the present embodiment, and then a 200 nm thick $Al_{99.5}Ta_{0.5}$ film was retrieved, whereupon the reflected light amount $I_2$ was measured. The transmission factor was obtained by the formula $(I_2/I_1)^{1/2}*100(\%)$.

The results indicate that some in-disc characteristic distribution presumably due to the small-thickness and tending-to-curve substrate and the non-uniform protective coating permitting transmission of light.

It is understood that it is possible to form and erase an amorphous mark easily even in the absence of a reflective layer by determining x and y within respective particular range.

What is claimed is:

1. A recording method for a phase-change recording medium having a phase-change recording layer in which amorphous marks each having a time length nT (T is the data reference clock period, and n is a natural number equal to or larger than 4) are formed by alternately irradiating the recording medium at least with a high-power energy beam having a relatively high power value and a low-power energy beam having a relatively low power value, said method comprising the steps of:

(a-1) irradiating the low-power energy beam to the recording medium for a first set time yT (y is a natural number larger than 0) as a preceding low-power pulse irradiation step immediately before a prospective leading pulse that is a time section where the high-power beam is irradiated for the first time, and (a-2) irradiating the low-power energy beam to the recording medium for a second set time xT (x is a natural number larger than 0) as a succeeding low-power pulse irradiation step immediately after said prospective leading pulse, x and y having a relation expressed by the following formula (A)

$$0.95 \leq x+0.7*y \leq 2.5 \tag{A}$$

where * is an arithmetic symbol representing a multiplication.

2. A recording method for a phase-change recording medium according to claim 1, wherein $1.3 \leq x+0.7*y \leq 2.0$.

3. A recording method for a phase-change recording medium according to claim 1, wherein said phase-change recording layer comprises an alloy composition having an excessive amount of Sb as compared to an Sb—Te eutectic composition.

4. A recording method for a phase-change recording medium according to claim 3, wherein said alloy composition of said phase-change recording layer comprises a chief component expressed by the following formula:

$$(Sb_a Te_{1-a})_b M_{1-b}$$

where a is a real number in a range of 0.6<a<0.9, b is a real number in a range of 0.7<b<1, and M is at least one element selected from the group consisting of Ge, Ag, In, Ga, Zn, Sn, Si, Cu, Au, Pd, Pt, Pb, Cr, Co, O, S, Se, V, Nb, Ta.

5. A recording method for a phase-change recording medium according to claim 1, wherein the time length of the irradiation of said high-power energy beam for said leading pulse is shorter than said second set time xT.

6. A recording method for a phase-change recording medium according to claim 1, wherein said phase-change recording medium is a medium devoid of a reflective layer that is disposed contiguously to said phase-change recording layer or with the medium of a protective layer to said phase-change recording layer.

7. A recording method for a phase-change recording medium according to claim 1, wherein said phase-change recording medium is a medium having a reflective layer of 30 nm or smaller in thickness and disposed contiguously to said phase-change recording layer or with the medium of a protective layer to said phase-change recording layer.

8. A recording method for a phase-change recording medium according to claim 1, wherein said phase-change recording medium is a multi-layer recording medium having two or more phase-change recording layers sandwiching an intermediate layer therebetween.

* * * * *